US012272292B2

(12) United States Patent
Wang et al.

(10) Patent No.: US 12,272,292 B2
(45) Date of Patent: Apr. 8, 2025

(54) METHOD AND SYSTEM FOR CONTROLLING VOLTAGE OUTPUT, DISPLAY DEVICE, ELECTRONIC DEVICE, AND NON-TRANSITORY COMPUTER READABLE MEDIUM

(71) Applicants: Chengdu BOE Optoelectronics Technology Co., Ltd., Sichuan (CN); BOE Technology Group Co., Ltd., Beijing (CN)

(72) Inventors: Chang Wang, Beijing (CN); Haotian Yang, Beijing (CN); Xin Li, Beijing (CN); Xin Mu, Beijing (CN); Bin Zhang, Beijing (CN); Seungyong Oh, Beijing (CN); Jiaxiang Zhang, Beijing (CN); Yuren Zhang, Beijing (CN); Hongjin Hu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/576,354

(22) PCT Filed: Apr. 18, 2023

(86) PCT No.: PCT/CN2023/088868
§ 371 (c)(1),
(2) Date: Jan. 3, 2024

(87) PCT Pub. No.: WO2023/207664
PCT Pub. Date: Nov. 2, 2023

(65) Prior Publication Data
US 2024/0331607 A1 Oct. 3, 2024

(30) Foreign Application Priority Data
Apr. 25, 2022 (CN) ........................ 202210443000.3

(51) Int. Cl.
*G09G 3/20* (2006.01)

(52) U.S. Cl.
CPC ....... *G09G 3/2092* (2013.01); *G09G 2310/08* (2013.01); *G09G 2320/0233* (2013.01); *G09G 2330/028* (2013.01)

(58) Field of Classification Search
CPC ............. G09G 3/2092; G09G 2310/08; G09G 2320/0233; G09G 2330/028; G09G 3/36; G09G 3/32; G09G 3/3208; G09G 2330/02
See application file for complete search history.

(56) References Cited

U.S. PATENT DOCUMENTS

2008/0143698 A1 6/2008 Lee et al.
2009/0303166 A1 * 12/2009 Tsubata .................. G09G 3/342 345/87

(Continued)

FOREIGN PATENT DOCUMENTS

CN 101206843 B 1/2012
CN 104167190 A 11/2014

(Continued)

OTHER PUBLICATIONS

CN202210443000.3 first office action dated Jun. 17, 2024.

*Primary Examiner* — Sahlu Okebato
(74) *Attorney, Agent, or Firm* — IPro, PLLC

(57) ABSTRACT

A method for controlling voltage output is disclosed. The method is used to control a power supply module to provide a required operating voltage to a display panel, and a display frame of the display panel comprises a plurality of sequential row driving periods, each row driving period comprising a charging period and a non-charging period, wherein during the charging period, a connection between a data line and a corresponding row of sub-pixels is enabled so that data voltages are written into the corresponding sub-pixels. The (Continued)

method comprises controlling the power supply module to output an operating voltage at a preset first operating frequency during a display of a picture to be displayed, wherein a time period during which the power supply module outputs the operating voltage to the display panel does not overlap with the charging period of each row driving period.

20 Claims, 8 Drawing Sheets

(56) References Cited

U.S. PATENT DOCUMENTS

| | | | | |
|---|---|---|---|---|
| 2014/0340382 | A1 | 11/2014 | Sawabe et al. | |
| 2016/0104408 | A1* | 4/2016 | Kim | G09G 3/36 345/690 |
| 2017/0124958 | A1 | 5/2017 | Pyo et al. | |
| 2022/0189386 | A1* | 6/2022 | Yao | G09G 3/32 |
| 2023/0267881 | A1 | 8/2023 | Feng et al. | |

FOREIGN PATENT DOCUMENTS

| | | | |
|---|---|---|---|
| CN | 106128407 | A | 11/2016 |
| CN | 106710563 | A | 5/2017 |
| CN | 106847219 | A | 6/2017 |
| CN | 107665692 | A | 2/2018 |
| CN | 113971936 | A | 1/2022 |
| CN | 114863889 | A | 8/2022 |
| EP | 3605517 | A1 | 2/2020 |
| JP | 2011123508 | A | 6/2011 |
| JP | 2012145946 | A | 8/2012 |

* cited by examiner

METHOD AND SYSTEM FOR CONTROLLING VOLTAGE OUTPUT, DISPLAY DEVICE, ELECTRONIC DEVICE, AND NON-TRANSITORY COMPUTER READABLE MEDIUM

The present application is a National Stage of International Application No. PCT/CN2023/088868 filed on Apr. 18, 2023, which claims priority to Chinese Patent Application No. 202210443000.3, filed on Apr. 25, 2022 and entitled "VOLTAGE OUTPUT CONTROL METHOD AND SYSTEM, DISPLAY CONTROL SYSTEM, AND DISPLAY DEVICE", the contents of both of which are incorporated herein by reference in their entirety.

TECHNICAL FIELD

The present disclosure relates to the display field, in particular, relates to a method and system for controlling voltage output, a display control system, a display device, an electronic device, and a non-transitory computer-readable medium.

BACKGROUND

A display device generally includes a display control system and a display panel (including source driver circuits and gate driver circuits). The display control system includes a power supply module, with its core component being the charge pump, also referred to as a booster circuit. The power supply module is configured to provide the required operating voltage to the display panel, which includes but is not limited to high-level operating voltage VGH, low-level operating voltage VGL, reference voltage Vref, initialization voltage Vinit, common voltage Vcom, etc.

The power supply module provides operating voltage to the display panel at a preset operating frequency (also referred to as the output frequency of the power supply module). The operating frequency of the current power supply module is set based on considerations about the power consumption of the power supply module. In practical applications, it has been observed that the current power supply module, during the process of outputting operating voltage to the display panel, has a certain impact on the display frame, leading to the appearance of noticeable unevenness (mura) in the display frame.

SUMMARY

The present disclosure provides a method and system for controlling voltage output, a display control system, a display device, an electronic device, and a non-transitory computer-readable medium.

In a first aspect, a method for controlling voltage output is provided according to the embodiments disclosed herein. The method is used to control a power supply module to provide a required operating voltage to a display panel, and a process of displaying a frame on the display panel includes a plurality of sequential row driving periods, each row driving period including a charging period and a non-charging period, wherein during the charging period, a connection between a data line and a corresponding row of sub-pixels is enabled so that data voltages are written into the corresponding sub-pixels; and during the non-charging period, the data line is disconnected from the sub-pixels;

the method for controlling voltage output includes:

controlling the power supply module to output an operating voltage at a preset first operating frequency during a display of a picture to be displayed, wherein a time period during which the power supply module outputs the operating voltage to the display panel does not overlap with the charging period.

In some embodiments, the method further includes: detecting whether the picture to be displayed is a first picture, wherein upon detecting that the picture to be displayed is the first picture, the step of controlling the power supply module to output the operating voltage at the preset first operating frequency during the display of the picture to be displayed is performed.

In some embodiments, the first picture is an overloading picture.

In some embodiments, the method further includes:

controlling, upon detecting that the picture to be displayed is not the first picture, the power supply module to output an operating voltage at a preset second operating frequency during the display of the picture to be displayed, wherein the second operating frequency is less than the first operating frequency.

In some embodiments, the step of controlling the power supply module to output the operating voltage at the preset first operating frequency during the display of the picture to be displayed includes:

sending a first clock signal having a first clock frequency to the power supply module during the display of the picture to be displayed, such that the power supply module outputs the operating voltage at the first operating frequency;

and the step of controlling the power supply module to output the operating voltage at the preset second operating frequency during the display of the picture to be displayed includes:

sending a second clock signal having a second clock frequency to the power supply module during the display of the picture to be displayed, such that the power supply module outputs the operating voltage at the second operating frequency, wherein the second clock frequency is less than the first clock frequency.

In some embodiments, the display panel includes a plurality of columns of sub-pixels, each column of sub-pixels being configured with a corresponding data line, wherein the sub-pixels disposed at a same column are all connected to the corresponding data line;

the step of detecting whether the picture to be displayed is the first picture includes:

determining an overloading degree of the picture to be displayed based on variation in data voltages among different sub-pixels within each column of sub-pixels in the picture to be displayed; and determining whether the picture to be displayed is the first picture based on the overloading degree and a preset degree threshold, wherein in a case that the overloading degree exceeds the preset degree threshold, it is determined that the picture to be displayed is the first picture; and in a case that the overloading degree is less than or equal to the preset degree threshold, it is determined that the picture to be displayed is not the first picture.

In some embodiments, the display panel includes M*N sub-pixels arranged in an array with N rows and M columns;

the step of determining the overloading degree of the picture to be displayed based on the variation in data voltages among different sub-pixels within each column of sub-pixels in the picture to be displayed includes:

calculating data voltage variations between any two sub-pixels disposed at a same column and adjacent rows, comparing results separately with a preset variation threshold, and counting a frequency of the data voltage variations that exceed the preset variation threshold;

$$S_{(n\_m,n+1\_m)} = \frac{|V_{n\_m} - V_{n+1\_m}|}{V_{n\_m}}$$

where $S_{(n\_m,n+1\_m)}$ represents a data voltage variation between a sub-pixel disposed at an n-th row and a m-th column and a sub-pixel disposed at an (n+1)th row and a m-th column; $V_{n\_m}$ represents a data voltage of the sub-pixel disposed at the n-th row and the m-th column, and $V_{n+1\_m}$ represents a data voltage of the sub-pixel disposed at the (n+1)th row and the m-th column, where n is an integer, and $1 \leq n \leq N-1$; m is an integer, and $1 \leq m \leq M$;

and determining the overloading degree of the picture to be displayed based on the frequency of the data voltage variations that exceed the preset variation threshold;

$$P = \frac{K}{M*(N-1)}$$

where P represents the overloading degree of the picture to be displayed, and K represents the frequency of the data voltage variations that exceed the preset variation threshold.

In some embodiments, the first operating frequency f1 satisfies:

$$f1 = \frac{1}{Q*t_0};$$

where Q is an integer, and $1 \leq Q \leq 5$; $t_0$, represents a duration of each row driving period.

In a second aspect, a system for controlling voltage output is further provided according to the embodiments disclosed herein. The system is configured to control a power supply module to provide a required operating voltage to a display panel, and a process of displaying a frame on the display panel includes a plurality of sequential row driving periods, each row driving period including a charging period and a non-charging period, wherein during the charging period, a connection between a data line and a corresponding row of sub-pixels is enabled so that data voltages are written into the corresponding sub-pixels; and during the non-charging period, the data line is disconnected from the sub-pixels;

the system for controlling voltage output includes:

a first control module configured to control the power supply module to output an operating voltage at a preset first operating frequency during a display of a picture to be displayed, wherein a time period during which the power supply module outputs the operating voltage to the display panel does not overlap with the charging period.

In some embodiments, the system further includes:

a detection module configured to detect whether the picture to be displayed is a first picture, wherein the first control module is configured specifically to, in a case that the detection module detects that the picture to be displayed is the first picture, control the power supply module to output the operating voltage at the preset first operating frequency during the display of the picture to be displayed, wherein the time period during which the power supply module outputs the operating voltage to the display panel does not overlap with the charging period.

In some embodiments, the first picture is an overloading picture.

In some embodiments, the system further includes:

a second control module configured to, in a case that the detection module detects that the picture to be displayed is not the first picture, control the power supply module to output an operating voltage at a preset second operating frequency during the display of the picture to be displayed, wherein the second operating frequency is less than the first operating frequency.

In some embodiments, the first control module specifically includes:

a first clock output unit configured to send a first clock signal having a first clock frequency to the power supply module during the display of the picture to be displayed, such that the power supply module outputs the operating voltage at the first operating frequency;

and the second control module specifically includes:

a second clock output unit configured to send a second clock signal having a second clock frequency to the power supply module during the display of the picture to be displayed, such that the power supply module outputs the operating voltage at the second operating frequency, wherein the second clock frequency is less than the first clock frequency.

In some embodiments, the display panel includes a plurality of columns of sub-pixels, each column of sub-pixels being configured with a corresponding data line, wherein the sub-pixels disposed at a same column are all connected to the corresponding data line;

the detection module includes:

a determination unit configured to determine an overloading degree of the picture to be displayed based on variation in data voltages among different sub-pixels within each column of sub-pixels in the picture to be displayed; and an assessment unit configured to assess whether the picture to be displayed is the first picture based on the overloading degree and a preset degree threshold, wherein in a case that the overloading degree exceeds the preset degree threshold, it is determined that the picture to be displayed is the first picture; and in a case that the overloading degree is less than or equal to the preset degree threshold, it is determined that the picture to be displayed is not the first picture.

In some embodiments, the display panel includes M*N sub-pixels arranged in an array with N rows and M columns;

the determination unit includes:

a first operation subunit configured to calculate data voltage variations between any two sub-pixels disposed at a same column and adjacent rows, compare results separately with a preset variation threshold, and count a frequency of the data voltage variations that exceed the preset variation threshold;

$$S_{(n\_m,\,n+1\_m)} = \frac{|V_{n\_m} - V_{n+1\_m}|}{V_{n\_m}}$$

where $S_{(n\_m,n+1\_m)}$ represents a data voltage variation between a sub-pixel disposed at an n-th row and a m-th column and a sub-pixel disposed at an (n+1)th row and a m-th column; $V_{n\_m}$ represents a data voltage of the sub-pixel disposed at the n-th row and the m-th column, and $V_{n+1\_m}$ represents a data voltage of the sub-pixel disposed at the (n+1)th row and the m-th column, where n is an integer, and $1 \leq n \leq N-1$; m is an integer, and $1 \leq m \leq M$;

and a second operation subunit configured to determine the overloading degree of the picture to be displayed based on the frequency of the data voltage variations that exceed the preset variation threshold;

$$P = \frac{K}{M*(N-1)}$$

where P represents the overloading degree of the picture to be displayed, and K represents the frequency of the data voltage variations that exceed the preset variation threshold.

In some embodiments, the first operating frequency f1 satisfies:

$$f1 = \frac{1}{Q*t_0};$$

where Q is an integer, and $1 \leq Q \leq 5$; $t_0$ represents a duration of each row driving period.

In a third aspect, a display control system is further provided according to the embodiments disclosed herein. The system includes a power supply module and the system for controlling voltage output provided according to the second aspect.

In a fourth aspect, a display device is further provided according to the embodiments disclosed herein. The display device includes a display panel and the display control system provided according to the third aspect.

In a fifth aspect, an electronic device is further provided according to the embodiments disclosed herein. The electronic device includes:

one or more processors; and a memory for storing one or more programs, wherein the one or more programs, when running on the one or more processors, cause the one or more processors to implement the method for controlling voltage output provided according to the first aspect.

In some embodiments, the processor includes a field-programmable gate array.

In a sixth aspect, a non-transitory computer-readable medium is further provided according to the embodiments disclosed herein. The non-transitory computer-readable medium stores a computer program, wherein the computer program, when running on a processor, causes the processor to implement the steps in the method for controlling voltage output provided according to the first aspect.

DETAILED DESCRIPTION

To facilitate a better understanding of the disclosed technical solutions by those skilled in the art, a detailed description is provided below in conjunction with the accompanying drawings regarding a method for controlling voltage output, a system for controlling voltage output, a display control system, a display device, an electronic device, and a non-transitory computer-readable medium.

Figure 1:
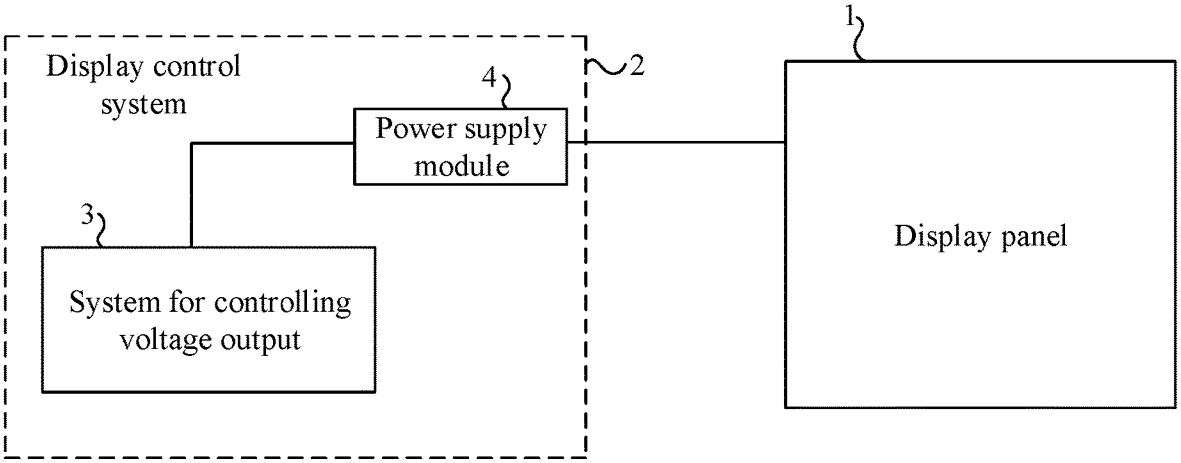
FIG. 1 is a block diagram of a systematic structure of a display device according to the technical solutions of the present disclosure.

FIG. 1 is a block diagram of a systematic structure of a display device according to the technical solutions of the present disclosure. As illustrated, FIG. 1 includes a display panel 1 and a display control system 2.

The display panel 1 can be categorized, based on the display dimension, as a 2D or 3D display panel. Additionally, the display panel 1 can be categorized, based on the type of illumination, as a liquid crystal display panel (LCD), a light-emitting diode (LED) display panel, an organic light-emitting diode (OLED) display panel, or a quantum dot light-emitting diode (QLED) display panel. The disclosed technical solutions do not impose restrictions on the type or structure of the display panel. In the embodiments disclosed herein, the display panel includes a plurality of sub-pixels arranged in an array along the row and column directions, each sub-pixel being connected to a corresponding row gate line and a corresponding column data line, wherein the sub-pixels disposed at the same row are connected to the same gate line, and the sub-pixels disposed at the same column are connected to the same data line.

The display panel 1 is configured with a gate driver circuit (not shown) and a source driver circuit (not shown). The gate driver circuit is configured to provide gate drive signals to the gate lines, enabling scanning and driving of the gate lines. The source driver circuit is configured to provide data voltage to the data lines, writing the data voltage through the data lines into the corresponding sub-pixels to control the grayscale display.

Figure 2:
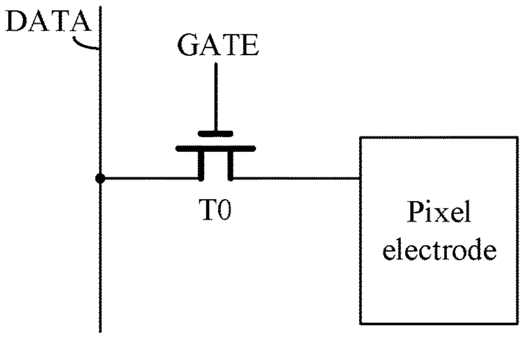
FIG. 2 is a schematic diagram of a circuit structure of a sub-pixel according to some embodiments of the present disclosure.

FIG. 2 is a schematic diagram of a circuit structure of a sub-pixel according to some embodiments of the present disclosure. As illustrated in FIG. 2, the sub-pixel is part of the liquid crystal display panel 1 and includes a switch transistor T0 and a pixel electrode. The control electrode of the switch transistor T0 is connected to the corresponding row gate line GATE, the first electrode of the switch transistor T0 is connected to the data line DATA, and the second electrode of the switch transistor T0 is connected to the pixel electrode. In the case that the drive signal provided by the gate line GATE is in an active level state, the switch transistor T0 conducts, allowing the data voltage from the data line DATA to be written into the pixel electrode.

Figure 3:
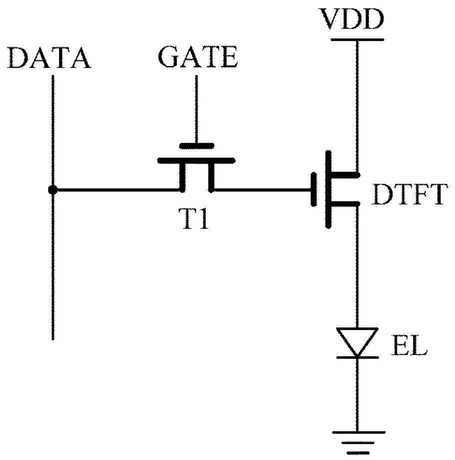
FIG. 3 is a schematic diagram of another circuit structure of a sub-pixel according to some embodiments of the present disclosure.

FIG. 3 is a schematic diagram of another circuit structure of a sub-pixel according to some embodiments of the present disclosure. As illustrated in FIG. 3, the sub-pixel is part of the LED/OLED/QLED display panel 1 and includes a data writing transistor T1, a driver transistor DTFT, and a light-emitting element EL (specifically LED, OLED, or QLED). The control electrode of the data writing transistor T1 is connected to the corresponding row gate line GATE, the first electrode of the data writing transistor T1 is connected to the data line DATA, and the second electrode of the data writing transistor T1 is connected to the control electrode of the driver transistor DTFT. The first electrode of the driver transistor DTFT is connected to the power supply terminal VDD, and the second electrode of the driver transistor DTFT is connected to the light-emitting element EL. In the case that the drive signal provided by the gate line GATE is in an active level state, the data writing transistor T1 conducts, allowing the data voltage from the data line DATA to be written into the control electrode of the driver transistor DTFT. The driver transistor DTFT then outputs the corresponding driving current.

It should be noted that the circuit structure of the sub-pixel according to the embodiments disclosed herein is not limited to what is illustrated in FIGS. 2 and 3; other circuit structures can also be used, which are not individually exemplified here.

In the embodiments disclosed herein, the specific form of the gate driver circuit is a chip with gate driving functionality (commonly referred to as Gate IC), or it is a circuit structure formed directly in the peripheral area of the display panel based on array substrate technology (Gate on Array, abbreviated as GOA). The specific form of the source driver circuit is a chip with source driving functionality (commonly referred to as Source IC). The source driver chip is bonded to connection pads on the display panel through a flexible printed circuit (FPC). The disclosed technical solutions do not impose restrictions on the specific structure of the gate driver circuit and the source driver circuit.

As illustrated in FIG. 1, the display control system 2 includes a system for controlling voltage output 3 and a power supply module 4. The system for controlling voltage output 3 is configured to receive display data for the picture to be displayed (including data voltages for each sub-pixel) and control the power supply module 4 to operate.

Figure 4:
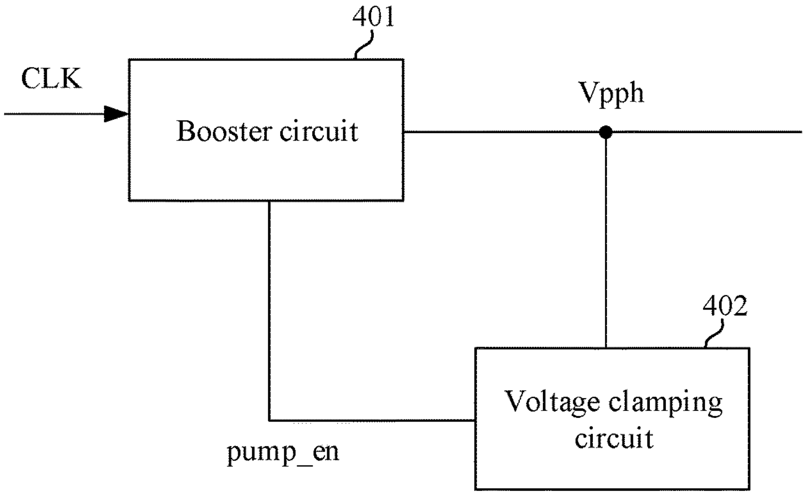
FIG. 4 is a schematic diagram of the circuit structure of a power supply module according to some embodiments of the present disclosure.
Figure 5:
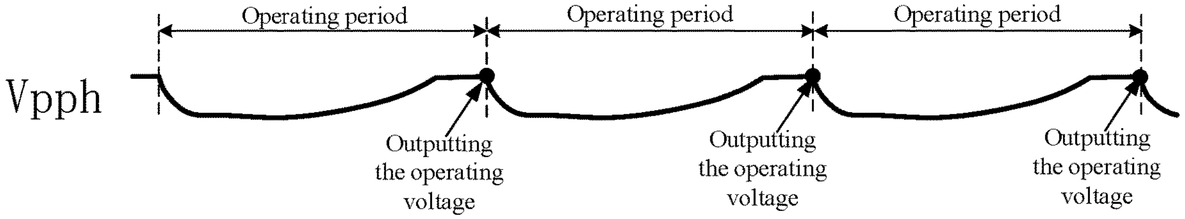
FIG. 5 is a timing diagram of the voltage Vpph to be outputted inside a power supply module.

FIG. 4 is a schematic diagram of the circuit structure of a power supply module according to some embodiments of the present disclosure, and FIG. 5 is a timing diagram of the voltage Vpph to be outputted inside a power supply module. As illustrated in FIGS. 4 and 5, the core component of the power supply module 4 is a charge pump, which includes a booster circuit 401 and a voltage clamping circuit 402. The booster circuit 401 performs boosting operations in response to the control of a clock signal CLK to gradually raise the voltage Vpph to be outputted. When the voltage Vpph to be outputted reaches the high clamping voltage of the voltage clamping circuit 402, signifying the completion of charge pump startup, the enable signal pump_en of the booster circuit 401 transitions from a high level to a low level. Consequently, the booster circuit 401 is turned off, and the charge pump outputs the voltage Vpph as the operating voltage (with a relatively short output duration), thereby supplying power from the power supply module 4 to the display panel. Subsequently, when the voltage Vpph to be outputted decreases below the low clamping voltage of the voltage clamping circuit 402 due to discharge or other reasons, the enable signal pump_en of the booster circuit 401 transitions from a low level to a high level, restarting the booster circuit 401. This cyclic process maintains the actual operating voltage outputted by the charge pump at a stable high level.

In practical applications, to enable the power supply module 4 to provide different operating voltages (e.g., high-level operating voltage VGH, low-level operating voltage VGL, reference voltage Vref, initialization voltage Vinit, common voltage Vcom), a plurality of booster circuits 401 and corresponding multiple voltage clamping circuits 402 (i.e., multiple charge pumps) are configured within the power supply module 4. Each booster circuit 401 and its corresponding voltage clamping circuit 402 are configured to achieve the output of an operating voltage. The present disclosure does not impose restrictions on the specific circuit structure of the power supply module 4.

Figure 6:
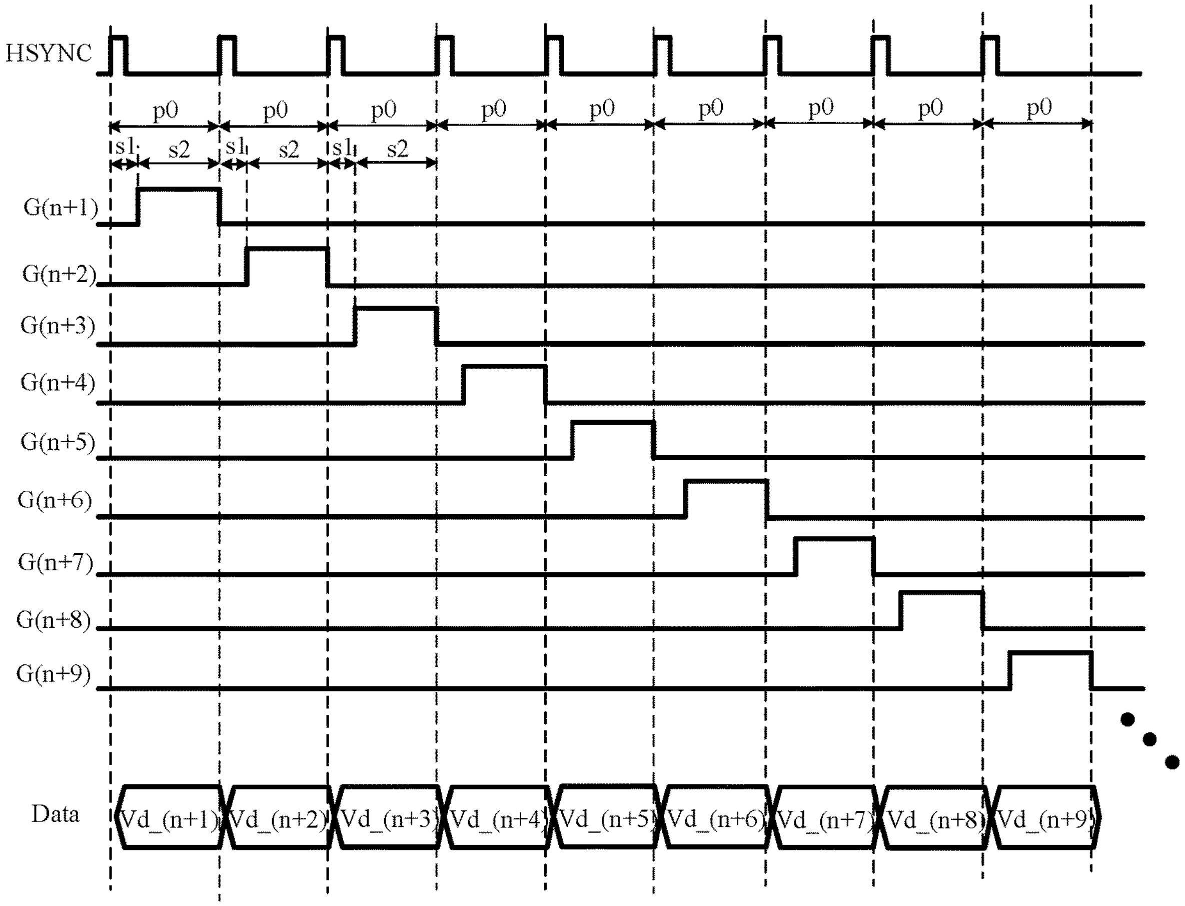
FIG. 6 is a time distribution diagram of displaying a frame according to some embodiments of the present disclosure.

FIG. 6 is a time distribution diagram of displaying a frame according to some embodiments of the present disclosure. As illustrated in FIG. 6, the process of displaying a frame on the display panel includes the pixel driving stage. In some embodiments, following the pixel driving stage, there is also a stable displaying stage (not shown in the figure). The pixel driving stage includes a plurality of row driving periods p0, each corresponding to individual sub-pixel rows (only 9 row driving periods p0 are illustratively depicted in FIG. 6). The plurality of row driving periods p0 proceed sequentially, wherein each row driving period p0 includes a charging period s2 and a non-charging period s1.

The start and end of each row driving period are controlled by the horizontal synchronization signal HSYNC. For example, as illustrated in FIG. 6, when the horizontal synchronization signal HSYNC transitions from a low level to a high level, it signifies the end of the previous row driving period p0 and the start of the current row driving period p0.

Take the driving of a particular row of sub-pixels as an example. During the charging period s2 corresponding to the row of sub-pixels, the gate driver circuit provides an active level signal, enabling the transistors for data writing (e.g., the switch transistor T0 in FIG. 2 or the data writing transistor T1 in FIG. 3) within the row of sub-pixels to be in a conducting state. Thus, the respective data lines write the corresponding data voltages Vd into each sub-pixel in the row of sub-pixels (commonly also referred to as the data voltage charging writing process). During the non-charging period s1 corresponding to the row of sub-pixels, the data lines are disconnected from the sub-pixels.

In some embodiments, as illustrated in FIG. 6, within a row driving period p0, a non-charging period s1 (commonly also referred to as a charging preparation period) is configured between the start of the row driving period p0 and the start of the charging period s2. This charging preparation period within the current row driving period serves as a row buffer period between the charging period s2 of the current row driving period and the charging period s2 of the previous row driving period.

In other embodiments, not only is a non-charging period s1 configured between the start of the row driving period p0 and the start of the charging period, but also a non-charging period (commonly also referred to as a charging end stabilization period) is configured between the end of the charging period and the end of the row driving period. The charging preparation period within the current row driving period p0 and the charging end stabilization period within the previous row driving period together serve as a row buffer period between the charging period s2 within the current row driving period and the charging period s2 within the previous row driving period. This scenario is not depicted in the accompanying drawings.

It should be noted that in FIG. 6, G(n+1) to G(n+9) represent the (n+1)th to (n+9)th gate lines, respectively. That is, FIG. 6 illustrates the timing of the (n+1)th to (n+9)th row driving periods p0 within the row driving periods p0. In addition, Vd_(n+1) to Vd_(n+9) in FIG. 6 represent the data voltages provided by a data line Data to the sub-pixels disposed in the (n+1)th to (n+9)th rows, respectively, wherein n represents a non-negative integer.

Figure 7:
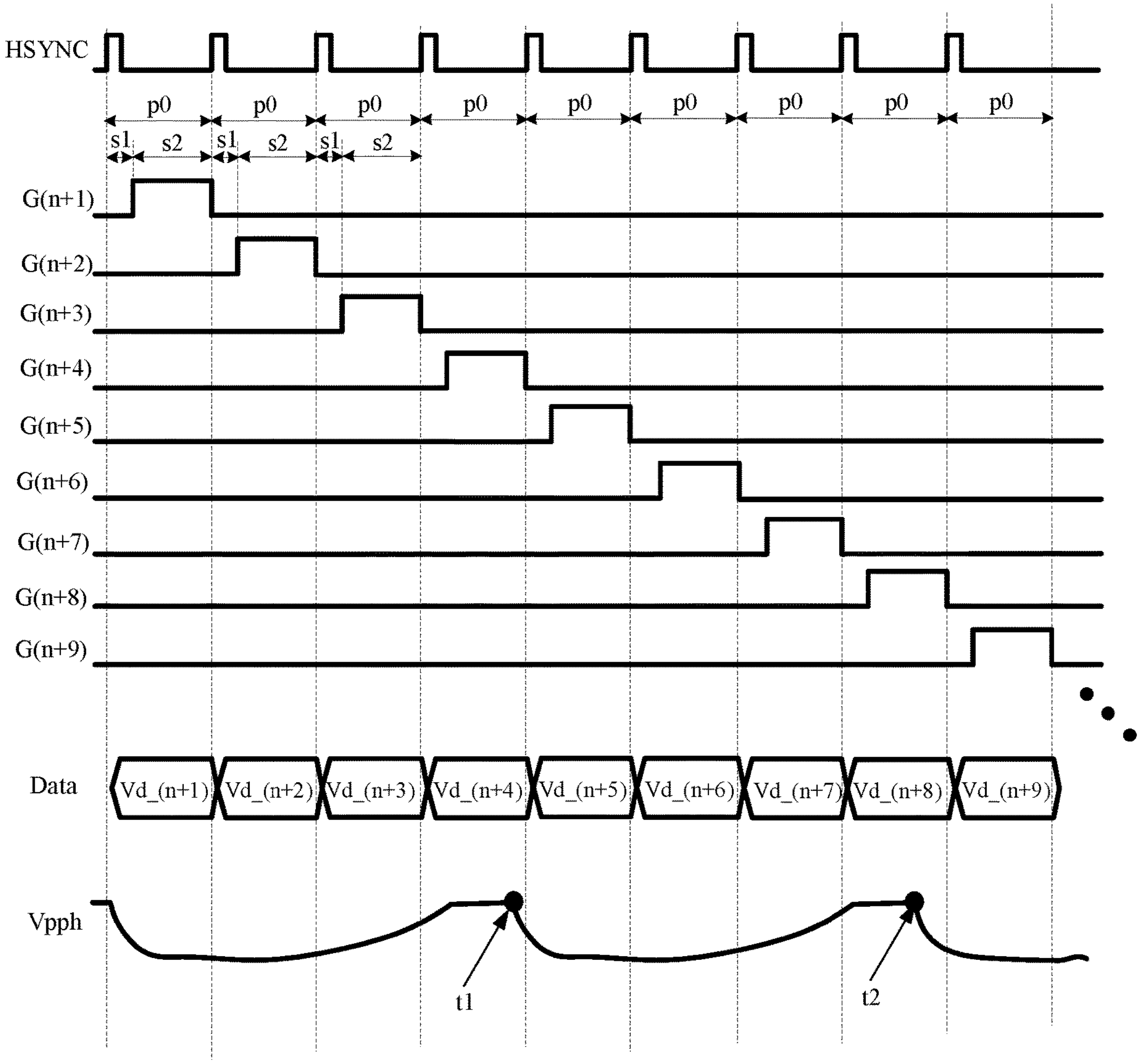
FIG. 7 is a timing diagram of the voltage Vpph to be outputted inside a power supply module and the display of a frame according to the related art.

FIG. 7 is a timing diagram of the voltage Vpph to be outputted inside a power supply module and the display of a frame according to the related art. As illustrated in FIG. 7, the design of the operating frequency of the power supply module in the related art considers only the power consumption factors. Generally, the operating frequency is configured as low as possible while meeting the requirements of resistive-capacitive delay and power supply to achieve power reduction objectives.

As illustrated in FIG. 7, the times when the power supply module outputs the operating voltage according to the related art fall within the charging periods of some row driving periods, and their corresponding positions within the different charging periods vary. For example, in FIG. 7, the time t1 when the power supply module outputs the operating voltage falls within a position toward the end of the charging period within the (n+4)th row driving period, while the time t2 when the power supply module outputs the operating voltage falls within a position toward the middle of the charging period within the (n+8)th row driving period.

In addition, for different frames, the times when the power supply module outputs the operating voltage vary in their positions within the row driving periods. For example, when displaying the current frame, the times when the power supply module outputs the operating voltage, as shown in FIG. 7, fall within the (n+4)th and (n+8)th row driving periods. However, when displaying the next frame, the times when the power supply module outputs the operating voltage may fall within the (n+3)th and (n+7)th row driving periods (not shown in a corresponding figure).

The power supply module, while outputting operating voltage to the display panel, causes some interference in the process of writing data voltages from the data lines to the sub-pixels. Especially in the case that significant voltage changes are required on the data lines (i.e., when two pixel units in the same column and adjacent rows have notably different data voltage loads, putting the data line into an overloaded state), the interference caused by the display panel for outputting operating voltage to charge the sub-pixels amplifies. This results in an inability to accurately write data voltages into the sub-pixels, leading to abnormal sub-pixel display and ultimately causing mura in the display panel.

To effectively address the aforementioned technical issues, the present disclosure provides corresponding solutions. Further details will be provided based on specific embodiments.

Figure 8:
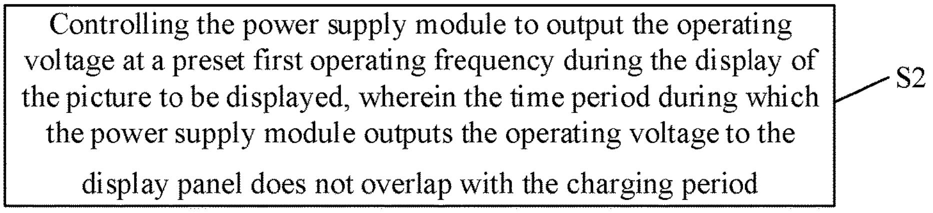
FIG. 8 is a flowchart of a method for controlling voltage output according to some embodiments of the present disclosure.

FIG. 8 is a flowchart of a method for controlling voltage output according to some embodiments of the present disclosure. As illustrated in FIG. 8, the method for controlling voltage output is employed within a system for controlling voltage output. The method for controlling voltage output is used to control the power supply module to provide the required operating voltage to the display panel. The process of displaying a frame on the display panel includes a plurality of sequential row driving periods, each row driving period including a charging period and a non-charging period, wherein during the charging period, the connection between the data line and the corresponding row of sub-pixels is enabled so that data voltages are written into the corresponding sub-pixels, and during the non-charging period, the data line is disconnected from the sub-pixels. The method for controlling voltage output includes:

In step S2, the power supply module is controlled to output the operating voltage at a preset first operating frequency during the display of the picture to be displayed. Additionally, the time period during which the power supply module outputs the operating voltage to the display panel does not overlap with the charging period.

In the embodiments disclosed herein, the operating frequency of the power supply module is controlled to ensure that the time when the power supply module outputs operating voltage to the display panel does not fall within a charging period. In other words, the time when the power supply module outputs operating voltage (a very brief period) is staggered from the charging period of the sub-pixels. As a result, the process of outputting operating voltage by the power supply module does not interfere with the charging process of any row of sub-pixels, effectively preventing the occurrence of mura.

Figure 9A:
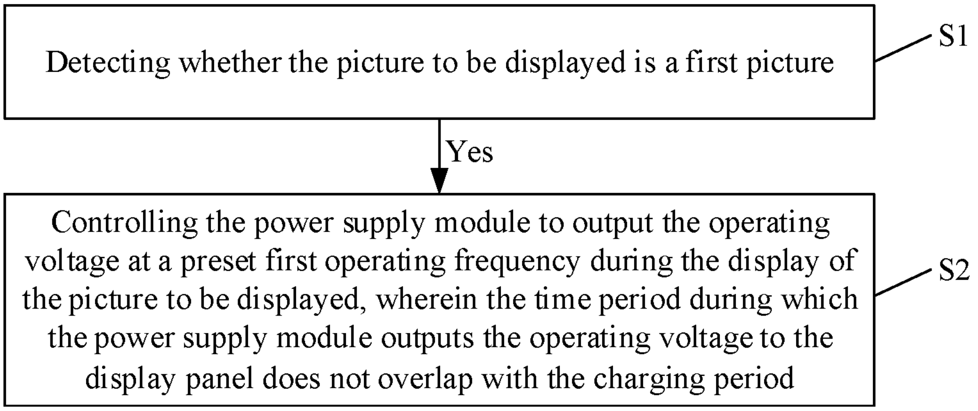
FIG. 9*a* is a flowchart of another method for controlling voltage output according to some embodiments of the present disclosure.

FIG. 9*a* is a flowchart of another method for controlling voltage output according to some embodiments of the present disclosure. As illustrated in FIG. 9*a*, the method for controlling voltage output includes:

In step S1, a picture to be displayed is detected to determine whether it is a first picture.

Upon detecting that the picture to be displayed is a first picture in step S1, the following step S2 is performed.

In step S2, the power supply module is controlled to output the operating voltage at a preset first operating frequency during the display of the picture to be displayed. Additionally, the time period during which the power supply module outputs the operating voltage to the display panel does not overlap with the charging period.

In the embodiments disclosed herein, the term "first picture" refers to a frame meeting a preset condition as required. In other words, in the embodiments disclosed herein, step S2 is applied to frames meeting the preset condition for power supply.

In some embodiments, the first picture is an overloading picture. The overloading picture refers to a frame where there is a higher frequency and/or greater magnitude of data voltage variations among different sub-pixels within each column of the sub-pixels. It reflects a higher frequency and greater magnitude of data voltage variations on the same signal channel outputted by the source driver chip during the display. This leads to increased complexity in outputting data by the source driver chip, placing it in a high-load state.

In the embodiments disclosed herein, before displaying the picture to be displayed, the picture to be displayed is initially detected to determine whether it is an overloading picture. Upon detecting that the picture to be displayed is an overloading picture, the operating frequency of the power supply module is controlled to ensure that the time when the power supply module outputs operating voltage to the display panel does not fall within a charging period. In other words, during the display of overloading pictures, the time when the power supply module outputs operating voltage (a very brief period) is staggered from the charging period of the sub-pixels. As a result, the process of outputting operating voltage by the power supply module does not interfere with the charging process of any row of sub-pixels, effectively preventing the occurrence of mura, and thereby ensuring the proper display of overloading pictures.

Figure 9B:
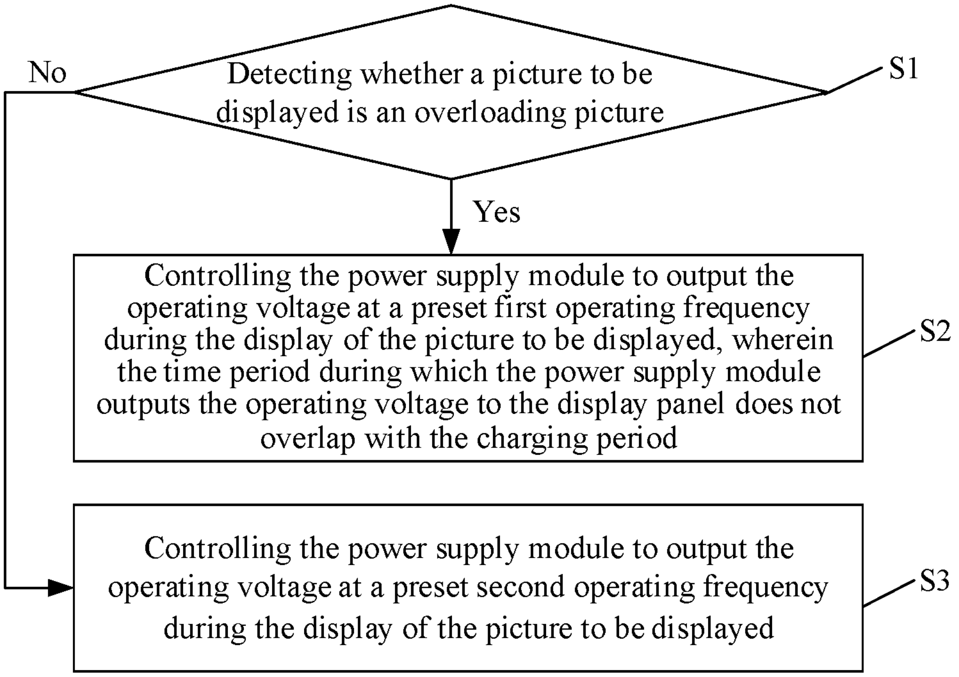
FIG. 9*b* is a flowchart of still another method for controlling voltage output according to some embodiments of the present disclosure.

FIG. 9*b* is a flowchart of still another method for controlling voltage output according to some embodiments of the present disclosure. In contrast to the previous embodiment illustrated in FIG. 9*a*, the embodiment illustrated in FIG. 9*b* includes not only steps S1 and S2 but further includes step S3. In some embodiments, the first picture in step S1 is an overloading picture. In the case that the picture to be displayed is assessed as an overloading picture in step S1, step S2 is performed; and in the case that the picture to be displayed is not assessed as an overloading picture in step S1, step S3 is performed. A detailed description for step S3 only will be provided below.

In step S3, the power supply module is controlled to output the operating voltage at a preset second operating frequency during the display of the picture to be displayed.

wherein the second operating frequency is less than the first operating frequency.

In some embodiments, the first operating frequency is at 72 kHz, while the second operating frequency is at 33 kHz. The specific values of the first operating frequency and the second operating frequency are set based on specific requirements.

In the embodiments disclosed herein, in the case that the picture to be displayed is detected as an overloading picture in step S1, the power supply module is controlled to output the operating voltage at a preset first operating frequency during the display of the picture to be displayed. Additionally, the time period during which the power supply module outputs the operating voltage to the display panel does not overlap with the charging period, thereby preventing the process of outputting operating voltage by the power supply module from interfering with the charging process of sub-pixels, and ensuring the proper display of overloading pictures. In the case that the picture to be displayed is not detected as an overloading picture (i.e., the picture to be displayed is an underloading frame) in step S1, the power supply module is controlled to output the operating voltage at a second operating frequency lower than the first operating frequency during the display of the picture to be displayed. The reduction in the operating frequency of the power supply module leads to a corresponding decrease in its power consumption.

The second operating frequency may be the operating frequency generally used in the prior art, which is configured as low as possible while meeting the requirements of resistive-capacitive delay and power supply.

In step S3, although there may be an overlap between the time when the power supply module outputs operating voltage and the charging period (as a result the process of outputting operating voltage by the power supply module interferes with the charging process of sub-pixels), because the picture to be displayed is an underloading frame, the interference caused by the operating voltage output process by the power supply module on the charging process of sub-pixels is small. As a result, there is a lower risk of mura appearing in the display frame, and any mura that may occur would be less apparent.

It can be observed that the disclosed technical solutions effectively prevent the occurrence of mura when displaying overloading pictures and reduce power consumption when displaying underloading frames.

It should be noted that in the case that the detected picture to be displayed is not an overloading picture, using step S3 to control the power supply module to output the operating voltage at a preset second operating frequency during the display of the picture to be displayed is only one preferred implementation in the embodiments disclosed herein, which effectively reduces power consumption. Those skilled in the art should understand that in the embodiments disclosed herein, it's also possible, in the case that the detected picture to be displayed is not an overloading picture, to utilize a method such as step S2, which involves controlling the power supply module to output the operating voltage at a preset first operating frequency during the display of the picture to be displayed, and ensuring that the time when the power supply module outputs operating voltage to the display panel does not overlap with the charging period (thereby preventing the process of outputting operating voltage by the power supply module from interfering with the charging process of sub-pixels), or to utilize a method that involves controlling the power supply module to use a third operating frequency higher than the first operating frequency to output the operating voltage (increasing the output capability of the power supply module). These methods should also fall within the protection scope of the present disclosure.

In some embodiments, step S2 specifically includes step S201.

In step S201, a first clock signal having a first clock frequency is sent to the power supply module during the display of the picture to be displayed, such that the power supply module outputs the operating voltage at the first operating frequency.

Step S3 specifically includes step S301.

In step S301, a second clock signal having a second clock frequency is sent to the power supply module during the display of the picture to be displayed, such that the power supply module outputs the operating voltage at the second operating frequency, wherein the second clock frequency is less than the first clock frequency.

Based on the previous content, it can be observed that the operating frequency (output frequency) of the power supply module is positively correlated with the clock frequency of the clock signal received by its internal boosting voltage. That is, the higher the clock frequency of the clock signal received by the power supply module, the higher its output frequency (the specific mapping relationship between the clock frequency and the output frequency is determined by the internal structure of the power supply module). The control of the operating frequency of the power supply module can be achieved by controlling the frequency of the clock signal output to the power supply module.

In some embodiments, the first operating frequency f1 satisfies:

$$f1 = \frac{1}{Q * t_0},$$

where Q is an integer, and 1≤Q≤5; $t_0$, represents the duration corresponding to one row driving period.

Figure 10:
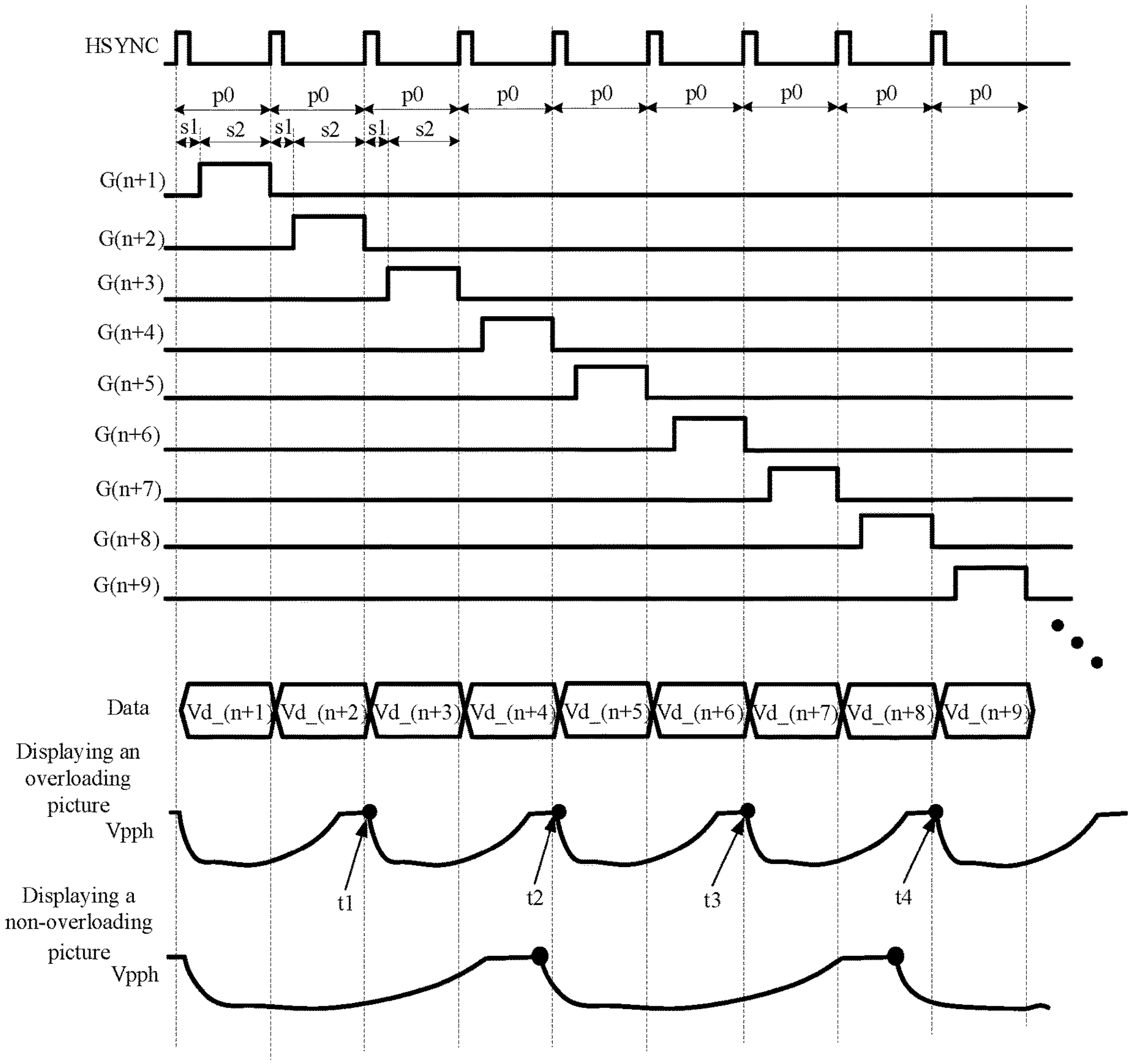
FIG. 10 is a timing diagram of the voltage Vpph to be outputted inside a power supply module and the display of a frame according to the present disclosure.

FIG. 10 is a timing diagram of the voltage Vpph to be outputted inside a power supply module and the display of a frame according to the present disclosure. As illustrated in FIG. 10, during the display of an overloading picture, the period of the power supply module outputting the operating voltage is $Q*t_0$, which equates to an integer multiple of one row driving period. In other words, ensuring that the time when the power supply module first outputs the operating voltage falls within a non-charging period of a row driving period during the display of an overloading picture guarantees that the subsequent times when the power supply module outputs the operating voltage will also fall within non-charging periods of the row driving periods.

As an example, Q is set to 2. In FIG. 10, during the display of an overloading picture, the time t1 when the power supply module outputs the operating voltage falls within the non-charging period of the (n+3)th row driving period, the time t2 when the power supply module outputs the operating voltage falls within the non-charging period of the (n+5)th row driving period, the time t3 when the power supply module outputs the operating voltage falls within the non-charging period of the (n+7)th row driving period, and the time t4 when the power supply module outputs the operating voltage falls within the non-charging period of the (n+9)th row driving period.

During the display of a non-overloading picture, the power supply module operates using a second operating frequency. For specific details, refer to the earlier description of FIG. 7. The details will not be reiterated here.

Figure 11:
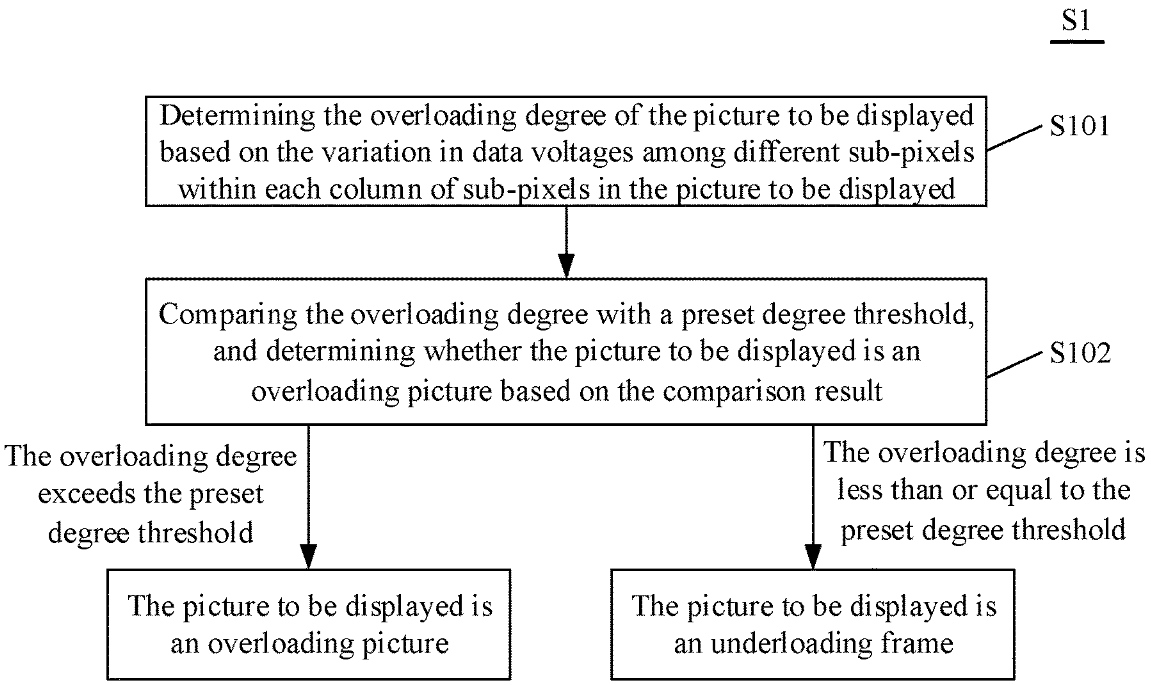
FIG. 11 is a flowchart of an optional implementation of step S1 according to some embodiments of the present disclosure.

FIG. 11 is a flowchart of an optional implementation of step S1 according to some embodiments of the present disclosure. As illustrated in FIGS. 9*a*, 9*b*, and 11, in some embodiments, step S1 includes:

In step S101, the overloading degree for a picture to be displayed is determined based on the variation in data voltages among different sub-pixels within each column of sub-pixels in the picture to be displayed.

In some embodiments, the display panel includes M*N sub-pixels arranged in an array with N rows and M columns. Step S101 includes:

In step S1011, the data voltage variations between any two sub-pixels disposed at the same column and adjacent rows are calculated, the results are compared separately with a preset variation threshold, and the frequency of data voltage variations that exceed the preset variation threshold is counted;

$$S_{(n\_m,\, n+1\_m)} = \frac{|V_{n\_m} - V_{n+1\_m}|}{V_{n\_m}}$$

where $S_{(n\_m,n+1\_m)}$ represents the data voltage variation between the sub-pixel disposed at the n-th row and m-th column and the sub-pixel disposed at the (n+1)th row and m-th column. $V_{n\_m}$ represents the data voltage of the sub-pixel disposed at the n-th row and m-th column, and $V_{n+1\_m}$ represents the data voltage of the sub-pixel disposed at the (n+1)th row and m-th column. Here, n is an integer, and 1≤n≤N−1; m is an integer, and 1≤m≤M.

For example, the preset variation threshold is typically set at or above 50%, such as 55%, 60%, 65%, 70%, 80%, 85%, 90%, 95%, etc. The values can be pre-designed and adjusted based on specific requirements.

In step S1012, the overloading degree of the picture to be displayed is determined based on the frequency of the data voltage variations that exceed the preset variation threshold;

$$P = \frac{K}{M * (N - 1)}$$

where P represents the overloading degree of the picture to be displayed, and K represents the frequency of the data voltage variations that exceed the preset variation threshold.

In step S102, the picture to be displayed is assessed based on the overloading degree and the preset degree threshold to determine whether it is an overloading picture.

In the case that the overloading degree exceeds the preset degree threshold, the picture to be displayed is assessed as an overloading picture. In the case that the overloading degree is less than or equal to the preset degree threshold, the picture to be displayed is assessed as a non-overloading picture (or underloading frame).

For example, the preset degree threshold is typically set at or above 50%, such as 55%, 60%, 65%, 70%, 80%, 85%, 90%, 95%, etc. The values can be pre-designed and adjusted based on specific requirements.

It should be noted that the assessment of whether a display frame is an overloading picture based on steps S101 and S102 is only an optional implementation in the embodiments disclosed herein, which does not impose restrictions on the disclosed technical solutions. "Overloading picture" is a recognized term in the art, and other algorithms in the related art may be employed to assess whether a frame is an overload frame within the present disclosure, which will not be reiterated here.

Based on the same inventive concept, a system for controlling voltage output is further provided according to the embodiments disclosed herein. The system for controlling voltage output is configured to control the power supply module to provide the required operating voltage to the display panel. The process of displaying a frame on the display panel includes a plurality of sequential row driving periods, each row driving period including a charging period and a non-charging period, wherein during the charging period, the connection between the data line and the corresponding row of sub-pixels is enabled so that data voltages are written into the corresponding sub-pixels, and during the non-charging period, the data line is disconnected from the sub-pixels.

Figure 12:
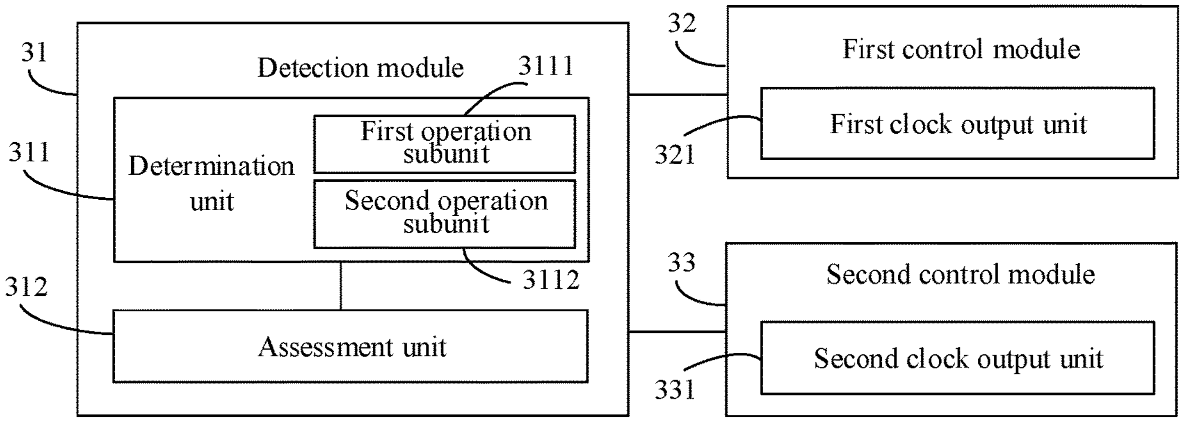
FIG. 12 is a structural block diagram of a system for controlling voltage output according to some embodiments of the present disclosure.

FIG. 12 is a structural block diagram of a system for controlling voltage output according to some embodiments of the present disclosure. As illustrated in FIG. 12, the system for controlling voltage output includes a first control module 32.

The first control module 32 is configured to control the power supply module to output the operating voltage at a preset first operating frequency during the display of a picture to be displayed. Additionally, the time period during which the power supply module outputs the operating voltage to the display panel does not overlap with the charging period.

In some embodiments, the system for controlling voltage output further includes a detection module 31. The detection module 31 is configured to detect whether a picture to be displayed is a first picture.

In this case, the first control module 32 is configured specifically to, in the case that the detection module detects that the picture to be displayed is the first picture, control the power supply module to output the operating voltage at a preset first operating frequency during the display of the picture to be displayed. Additionally, the time period during which the power supply module outputs the operating voltage to the display panel does not overlap with the charging period.

In some embodiments, the first picture is an overloading picture.

Furthermore, in some embodiments, the system for controlling voltage output further includes a second control module 33. The second control module 33 is configured to, in the case that the detection module 31 detects that the picture to be displayed is not the first picture, control the power supply module to output the operating voltage at a preset second operating frequency during the display of the picture to be displayed, wherein the second operating frequency is less than the first operating frequency.

In some embodiments, the first control module 32 specifically includes a first clock output unit 321. The first clock output unit is configured to send a first clock signal having a first clock frequency to the power supply module during the display of the picture to be displayed, such that the power supply module outputs the operating voltage at the first operating frequency.

The second control module 33 specifically includes a second clock output unit 331. The second clock output unit is configured to send a second clock signal having a second clock frequency to the power supply module during the display of the picture to be displayed, such that the power supply module outputs the operating voltage at the second operating frequency, wherein the second clock frequency is less than the first clock frequency.

In some embodiments, the first operating frequency f1 satisfies:

$$f1 = \frac{1}{Q * t_0};$$

where Q is an integer, and $1 \le Q \le 5$; $t_0$, represents the duration corresponding to one row driving period. In some embodiments, Q is set to 2.

In some embodiments, the display panel includes a plurality of columns of sub-pixels, each column of sub-pixels being configured with a corresponding data line, wherein the sub-pixels disposed at the same column are all connected to the corresponding data line.

The detection module 31 includes a determination unit 311 and an assessment unit 312. The determination unit 311 is configured to determine the overloading degree for a picture to be displayed based on the variation in data voltages among different sub-pixels within each column of sub-pixels in the picture to be displayed. The assessment unit 312 is configured to assess whether the picture to be displayed is the first picture based on the overloading degree and a preset degree threshold. In the case that the overloading degree exceeds the preset degree threshold, it is determined that the picture to be displayed is the first picture; and in the case that the overloading degree is less than or equal to the preset degree threshold, it is determined that the picture to be displayed is not the first picture.

In some embodiments, the display panel includes M*N sub-pixels arranged in an array with N rows and M columns.

The determination unit 311 includes a first operation subunit 3111 and a second operation subunit 3112.

The first operation subunit 3111 is configured to calculate the data voltage variations between any two sub-pixels disposed at the same column and adjacent rows, compare the results separately with a preset variation threshold, and count the frequency of data voltage variations that exceed the preset variation threshold;

$$S_{(n\_m,n+1\_m)} = \frac{|V_{n\_m} - V_{n+1\_m}|}{V_{n\_m}}$$

where $S_{(n\_m,n+1\_m)}$ represents the data voltage variation between the sub-pixel disposed at the n-th row and m-th column and the sub-pixel disposed at the (n+1)th row and m-th column. $V_{n\_m}$ represents the data voltage of the sub-pixel disposed at the n-th row and m-th column, and $V_{n+1\_m}$ represents the data voltage of the sub-pixel disposed at the (n+1)th row and m-th column. Here, n is an integer, and $1 \le n \le N-1$; m is an integer, and $1 \le m \le M$.

The second operation subunit 3112 is configured to determine the overloading degree of the picture to be displayed based on the frequency of the data voltage variations that exceed the preset variation threshold;

$$P = \frac{K}{M * (N-1)}$$

where P represents the overloading degree of the picture to be displayed, and K represents the frequency of the data voltage variations that exceed the preset variation threshold.

For the specific descriptions of the aforementioned modules, units, and subunits, refer to the relevant content provided in the description of the method embodiments earlier. The details will not be reiterated here.

Based on the same inventive concept, a display control system is further provided according to the embodiments disclosed herein. As illustrated in FIG. 1, the display control system 2 includes a power supply module 4 and a system for controlling voltage output 3. The system for controlling voltage output 3 used is the system for controlling voltage output according to the previous embodiments, as described in detail in the preceding embodiments. The details will not be reiterated here.

Based on the same inventive concept, a display device is further provided according to the embodiments disclosed herein. As illustrated in FIG. 1, the display device includes a display panel 1 and a display control system 2. The display control system 2 used is the display control system according to the previous embodiments, as described in detail in the preceding embodiments. The details will not be reiterated here.

Figure 13:
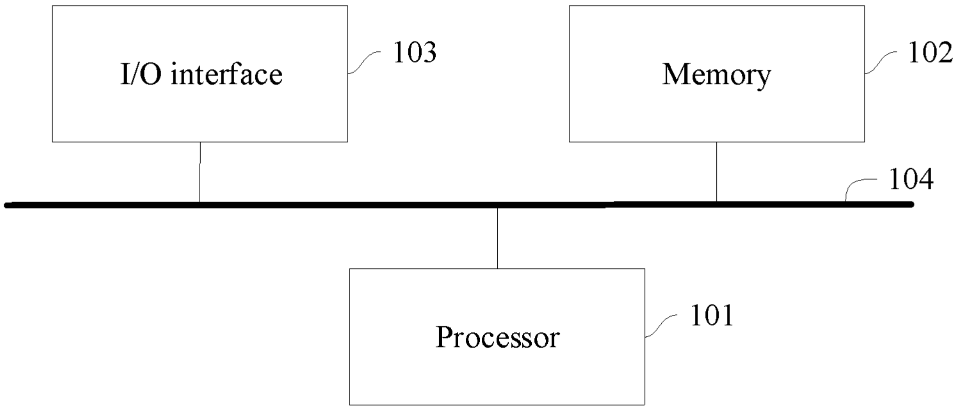
FIG. 13 is a schematic structural diagram of an electronic device according to some embodiments of the present disclosure.

Based on the same inventive concept, an electronic device is further provided according to the embodiments disclosed herein. FIG. 13 is a schematic structural diagram of an electronic device according to some embodiments of the present disclosure. As illustrated in FIG. 13, the electronic device according to the embodiments disclosed herein includes one or more processors 101, a memory 102, and one or more I/O interfaces 103. The memory 102 stores one or more programs. The one or more programs, when running on the one or more processors, cause the one or more processors to implement any one of the methods for controlling voltage output described in the embodiments above. The one or more I/O interfaces 103 are connected between the processor and the memory and configured to enable information exchange between the processor and the memory.

The processor 101 is a device capable of data processing, including but not limited to a central processing unit (CPU), among others. The memory 102 is a device capable of data storage, including but not limited to random access memory (RAM, more specifically such as SDRAM, DDR), read-only memory (ROM), electrically erasable programmable read-only memory (EEPROM), and flash memory. The I/O interface (read/write interface) 103 is connected between the processor 101 and the memory 102 and enables information exchange between the processor 101 and the memory 102, including but not limited to a data bus.

In some embodiments, the processor 101, the memory 102, and the I/O interfaces 103 are interconnected via the bus 104, thereby connecting with other components of the computing device.

In some embodiments, the one or more processors 101 include a field-programmable gate array.

According to the embodiments disclosed herein, a non-transitory computer-readable medium is further provided. The non-transitory computer-readable medium stores a computer program, wherein the program, when running on a processor, causes the processor to implement steps in any one of the methods for controlling voltage output described in the embodiments above.

Specifically, according to the embodiments disclosed herein, the processes described with reference to the flowcharts can be implemented as a computer software program. For example, the embodiments disclosed herein include a computer program product, including a computer program borne on a machine-readable medium. The computer program includes program codes for performing the methods illustrated in the flowcharts. In such embodiments, the computer program is downloaded and installed from the network via a communication section and/or installed from a removable medium. The computer program, when running on a central processing unit (CPU), causes the CPU to perform the above functionalities defined in the disclosed system.

It should be noted that the disclosed computer-readable medium may be a computer-readable signal medium, a computer-readable storage medium, or any combination thereof. The computer-readable storage medium includes, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with one or more wires, a portable computer disk, a hard disk, a random access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium is any tangible medium containing or storing a program for use by or in conjunction with an instruction execution system, apparatus, or device. Moreover, in the present disclosure, the computer-readable signal medium includes data signals propagated in baseband or as part of a carrier wave, bearing computer-readable program codes. These propagated data signals take various forms, including but not limited to electromagnetic signals, optical signals, or any suitable combination thereof. The computer-readable signal medium may also be any computer-readable medium other than the computer-readable storage medium, which sends, propagates, or transmits a program for use by or in conjunction with an instruction execution system, apparatus, or device. Program codes contained on the computer-readable medium are transmitted using any suitable medium, including but not limited to wireless, wired, optical cables, RF, or any suitable combination thereof.

The flowcharts and block diagrams in the accompanying drawings illustrate the architecture, functionality, and operations that can be implemented for the systems, methods, and computer program products according to the embodiments disclosed herein. In this regard, each block in the flowcharts or block diagrams may represent a module, program segment, or a portion of code, which includes one or more executable instructions for implementing specific logical functions. It should also be noted that in some alternate implementations, functions noted in the blocks may occur in different orders than noted in the accompanying drawings. For example, blocks shown consecutively can actually execute in parallel, or sometimes, in the reverse order, depending on the functionality involved. Also, it should be noted that each block in the block diagrams and/or flowcharts, and the combination of blocks in the block diagrams and/or flowcharts, can be implemented using a specialized hardware-based system performing the specified functions or operations, or a combination of specialized hardware and computer instructions.

The circuits or sub-circuits described in the embodiments disclosed herein can be implemented through software or hardware. The described circuits or sub-circuits can also be configured within a processor, for example, described as: a processor comprising a receiving circuit and a processing circuit, wherein the processing module includes a write sub-circuit and a read sub-circuit. Furthermore, the names of these circuits or sub-circuits in some cases do not limit the circuit or sub-circuit itself; for example, a receiving circuit may also be described as "receiving a video signal".

It may be understood that the above embodiments are merely exemplary embodiments employed to illustrate the principles of the present disclosure, and the present disclosure is not limited thereto. It will be apparent to those of ordinary skill in the art that various changes and modifications can be made without departing from the spirit and scope of the present disclosure, and these changes and modifications are also considered to fall within the scope of the present disclosure.

What is claimed is:

1. A method for controlling voltage output, wherein the method is used to control a power supply module to provide a required operating voltage to a display panel, and a display frame of the display panel comprises a plurality of sequential row driving periods, each row driving period comprising a charging period and a non-charging period; wherein during the charging period, a connection between a data line and a corresponding row of sub-pixels is enabled so that data voltages are written into corresponding sub-pixels; and during the non-charging period, the data line is disconnected from the sub-pixels;

the method for controlling voltage output comprises:

controlling the power supply module to output an operating voltage at a preset first operating frequency during a display of a picture to be displayed, wherein a time period during which the power supply module outputs the operating voltage to the display panel does not overlap with the charging period of each row driving period.

2. The method for controlling voltage output according to claim 1, further comprising:

detecting whether the picture to be displayed is a first picture;

wherein upon detecting that the picture to be displayed is the first picture, controlling the power supply module to output the operating voltage at the preset first operating frequency during the display of the picture to be displayed.

3. The method for controlling voltage output according to claim 2, wherein the first picture is an overloading picture.

4. The method for controlling voltage output according to claim 3, further comprising:

controlling, upon detecting that the picture to be displayed is not the first picture, the power supply module to output an operating voltage at a preset second operating frequency during the display of the picture to be displayed;

wherein the second operating frequency is less than the first operating frequency.

5. The method for controlling voltage output according to claim 4, wherein controlling the power supply module to output the operating voltage at the preset first operating frequency during the display of the picture to be displayed comprises:

sending a first clock signal having a first clock frequency to the power supply module during the display of the picture to be displayed, such that the power supply module outputs the operating voltage at the first operating frequency;

and controlling the power supply module to output the operating voltage at the preset second operating frequency during the display of the picture to be displayed comprises:

sending a second clock signal having a second clock frequency to the power supply module during the display of the picture to be displayed, such that the power supply module outputs the operating voltage at the second operating frequency;

wherein the second clock frequency is less than the first clock frequency.

6. The method for controlling voltage output according to claim 3, wherein the display panel comprises a plurality of columns of sub-pixels, each column of sub-pixels being configured with a corresponding data line, wherein sub-pixels disposed at the same column are all connected to a corresponding data line; and detecting whether the picture to be displayed is the first picture comprises:

determining an overloading degree of the picture to be displayed based on variation in data voltages among different sub-pixels within each column of sub-pixels in the picture to be displayed; and determining whether the picture to be displayed is the first picture based on the overloading degree and a preset degree threshold;

wherein in a case that the overloading degree exceeds the preset degree threshold, it is determined that the picture to be displayed is the first picture; and in a case that the overloading degree is less than or equal to the preset degree threshold, it is determined that the picture to be displayed is not the first picture.

7. The method for controlling voltage output according to claim 6, wherein the display panel comprises M*N sub-pixels arranged in an array with N rows and M columns;

determining the overloading degree of the picture to be displayed based on the variation in data voltages among different sub-pixels within each column of sub-pixels in the picture to be displayed comprises:

calculating data voltage variations between any two sub-pixels disposed at the same column and adjacent rows, comparing results separately with a preset variation threshold, and counting a frequency of the data voltage variations that exceed the preset variation threshold; wherein $$S_{(n\_m,\, n+1\_m)} = \frac{|V_{n\_m} - V_{n+1\_m}|}{V_{n\_m}},$$

where $S_{(n\_m,n+1\_m)}$ represents a data voltage variation between a sub-pixel disposed at an n-th row and a m-th column and a sub-pixel disposed at an (n+1)th row and a m-th column; $V_{n\_m}$ represents a data voltage of the sub-pixel disposed at the n-th row and the m-th column, and $V_{n+1\_m}$ represents a data voltage of the sub-pixel disposed at the (n+1)th row and the m-th column, where n is an integer, and $1 \le n \le N-1$; and m is an integer, and $1 \le m \le M$;

and determining the overloading degree of the picture to be displayed based on the frequency of the data voltage variations that exceed the preset variation threshold; wherein $$P = \frac{K}{M*(N-1)},$$

where P represents the overloading degree of the picture to be displayed, and K represents the frequency of the data voltage variations that exceed the preset variation threshold.

8. The method for controlling voltage output according to claim 1, wherein the first operating frequency f1 satisfies:

$$f1 = \frac{1}{Q*t_0};$$

where Q is an integer, and $1 \le Q \le 5$; and $t_0$ represents a duration of each row driving period.

9. A system for controlling voltage output, wherein the system is configured to control a power supply module to provide a required operating voltage to a display panel, and a display frame of the display panel comprises a plurality of sequential row driving periods, each row driving period comprising a charging period and a non-charging period; wherein during the charging period, a connection between a data line and a corresponding row of sub-pixels is enabled so that data voltages are written into the corresponding sub-pixels; and during the non-charging period, the data line is disconnected from the sub-pixels;

the system for controlling voltage output comprises:

a first control module configured to control the power supply module to output an operating voltage at a preset first operating frequency during a display of a picture to be displayed, wherein a time period during which the power supply module outputs the operating voltage to the display panel does not overlap with the charging period of each row driving period.

10. The system for controlling voltage output according to claim 9, further comprising:

a detection module configured to detect whether the picture to be displayed is a first picture, wherein the first control module is configured specifically to control, when the detection module detects that the picture to be displayed is the first picture, the power supply module to output the operating voltage at the preset first operating frequency during the display of the picture to be displayed, wherein the time period during which the power supply module outputs the operating voltage to the display panel does not overlap with the charging period.

11. The system for controlling voltage output according to claim 10, wherein the first picture is an overloading picture.

12. The system for controlling voltage output according to claim 11, further comprising:

a second control module configured to control, when the detection module detects that the picture to be displayed is not the first picture, the power supply module to output an operating voltage at a preset second operating frequency during the display of the picture to be displayed; wherein the second operating frequency is less than the first operating frequency.

13. The system for controlling voltage output according to claim 12, wherein the first control module specifically comprises:

a first clock output unit configured to send a first clock signal having a first clock frequency to the power supply module during the display of the picture to be displayed, such that the power supply module outputs the operating voltage at the first operating frequency;

and the second control module specifically comprises:

a second clock output unit configured to send a second clock signal having a second clock frequency to the power supply module during the display of the picture to be displayed, such that the power supply module outputs the operating voltage at the second operating frequency; wherein the second clock frequency is less than the first clock frequency.

14. The system for controlling voltage output according to claim 11, wherein the display panel comprises a plurality of columns of sub-pixels, each column of sub-pixels being configured with a corresponding data line, wherein the sub-pixels disposed at a same column are all connected to the corresponding data line;

the detection module comprises:

a determination unit configured to determine an overloading degree of the picture to be displayed based on variation in data voltages among different sub-pixels within each column of sub-pixels in the picture to be displayed; and an assessment unit configured to assess whether the picture to be displayed is the first picture based on the overloading degree and a preset degree threshold, wherein in a case that the overloading degree exceeds the preset degree threshold, it is determined that the picture to be displayed is the first picture; and in a case that the overloading degree is less than or equal to the preset degree threshold, it is determined that the picture to be displayed is not the first picture.

15. The system for controlling voltage output according to claim 14, wherein the display panel comprises M*N sub-pixels arranged in an array with N rows and M columns;

the determination unit comprises:

a first operation subunit configured to calculate data voltage variations between any two sub-pixels disposed at a same column and adjacent rows, compare results separately with a preset variation threshold, and count a frequency of the data voltage variations that exceed the preset variation threshold; wherein $$S_{(n\_m,\, n+1\_m)} = \frac{|V_{n\_m} - V_{n+1\_m}|}{V_{n\_m}},$$

where $S_{(n\_m,n+1\_m)}$ represents a data voltage variation between a sub-pixel disposed at an n-th row and a m-th column and a sub-pixel disposed at an (n+1)th row and a m-th column; $V_{n\_m}$ represents a data voltage of the sub-pixel disposed at the n-th row and the m-th column, and $V_{n+1\_m}$ represents a data voltage of the sub-pixel disposed at the (n+1)th row and the m-th column, where n is an integer, and $1 \le n \le N-1$; and m is an integer, and $1 \le m \le M$;

and a second operation subunit configured to determine the overloading degree of the picture to be displayed based on the frequency of the data voltage variations that exceed the preset variation threshold; wherein $$P = \frac{K}{M*(N-1)},$$

where P represents the overloading degree of the picture to be displayed, and K represents the frequency of the data voltage variations that exceed the preset variation threshold.

16. The system for controlling voltage output according to claim 9, wherein the first operating frequency f1 satisfies:

$$f1 = \frac{1}{Q*t_0};$$

where Q is an integer, and $1 \le Q \le 5$; and $t_0$ represents a duration of each row driving period.

17. A display control system, comprising a power supply module and the system for controlling voltage output according to claim 9.

18. A display device, comprising a display panel and the display control system according to claim 17.

19. An electronic device, comprising:

one or more processors; and a memory for storing one or more programs, wherein the one or more programs, when running on the one or more processors, cause the one or more processors to implement the method for controlling voltage output according to claim 1.

20. A non-transitory computer-readable medium storing a computer program, wherein the computer program, when running on a processor, causes the processor to implement the method for controlling voltage output according to claim 1.

* * * * *